United States Patent
Baba et al.

[19]
[11] Patent Number: 6,097,420
[45] Date of Patent: Aug. 1, 2000

[54] METHOD AND APPARATUS FOR MARKING PATTERNS BY A SCANNING LASER BEAM, A MASK APPLIED TO THE SAME APPARATUS

[75] Inventors: Yoshimitsu Baba; Satoshi Togari, both of Tokyo, Japan

[73] Assignee: NEC Corporation, Tokyo, Japan

[21] Appl. No.: 08/563,487

[22] Filed: Nov. 28, 1995

[30] Foreign Application Priority Data

Nov. 28, 1994 [JP] Japan .................................. 6-292623

[51] Int. Cl.⁷ .................................................. G02B 27/00
[52] U.S. Cl. ............................................ 347/258; 347/241
[58] Field of Search .................................. 347/256, 258, 347/259, 260, 243, 241; 359/716; 264/1.37

[56] References Cited

U.S. PATENT DOCUMENTS

| | | | |
|---|---|---|---|
| 3,947,093 | 3/1976 | Goshima et al. | 359/716 |
| 5,053,171 | 10/1991 | Portney et al. | 264/1.37 |
| 5,389,954 | 2/1995 | Inaba et al. | 347/258 |
| 5,521,628 | 5/1996 | Montgomery | 347/243 |

FOREIGN PATENT DOCUMENTS

| | | |
|---|---|---|
| 0274205A2 | 7/1988 | European Pat. Off. . |
| 0492844A2 | 7/1992 | European Pat. Off. . |
| 0599076A2 | 6/1994 | European Pat. Off. . |
| 59-45091 | 3/1984 | Japan . |
| 60-221721 | 11/1985 | Japan . |
| 2165881 | 6/1990 | Japan . |
| 2187288 | 7/1990 | Japan . |
| 2251387 | 10/1990 | Japan . |

OTHER PUBLICATIONS

S. K. Dew et al.; "Absorbing filter to flatten Gaussian beams"; Applied Optics, vol. 31, No. 18, Jun. 20, 1992; pp. 3416–3419.

*Primary Examiner*—N. Le
*Assistant Examiner*—Hai C. Pham
*Attorney, Agent, or Firm*—Whitham, Curtis & Whitham

[57] ABSTRACT

Energy distribution at a section of a laser beam is leveled by causing the laser beam, emitted by a continuous wave Q-switch pulse from a laser oscillator having an acousto-optic Q-switch element, to pass through a mask having a mask pattern. The laser beam having passed the mask is reflected by a pair of reflection mirrors provided on a pair of galvanometers. The reflected laser beam passes through an objective lens and is focused on a processing object. A desired character or sign is marked on the processing object through a scanning with the laser beam focused on the processing object by driving a pair of galvanometers.

11 Claims, 8 Drawing Sheets

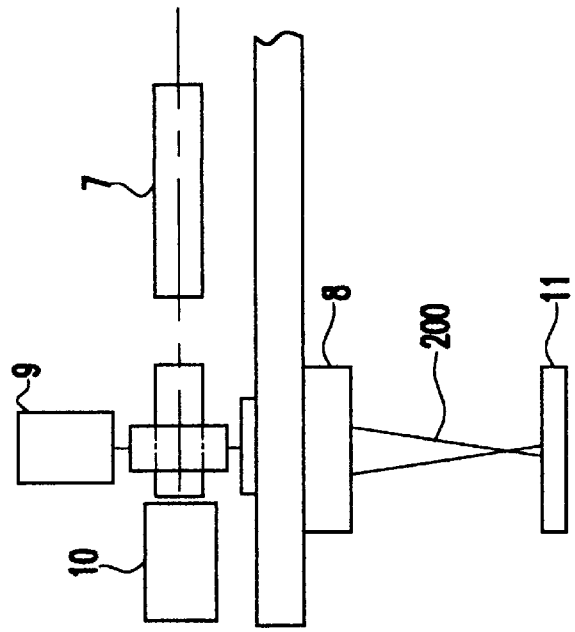
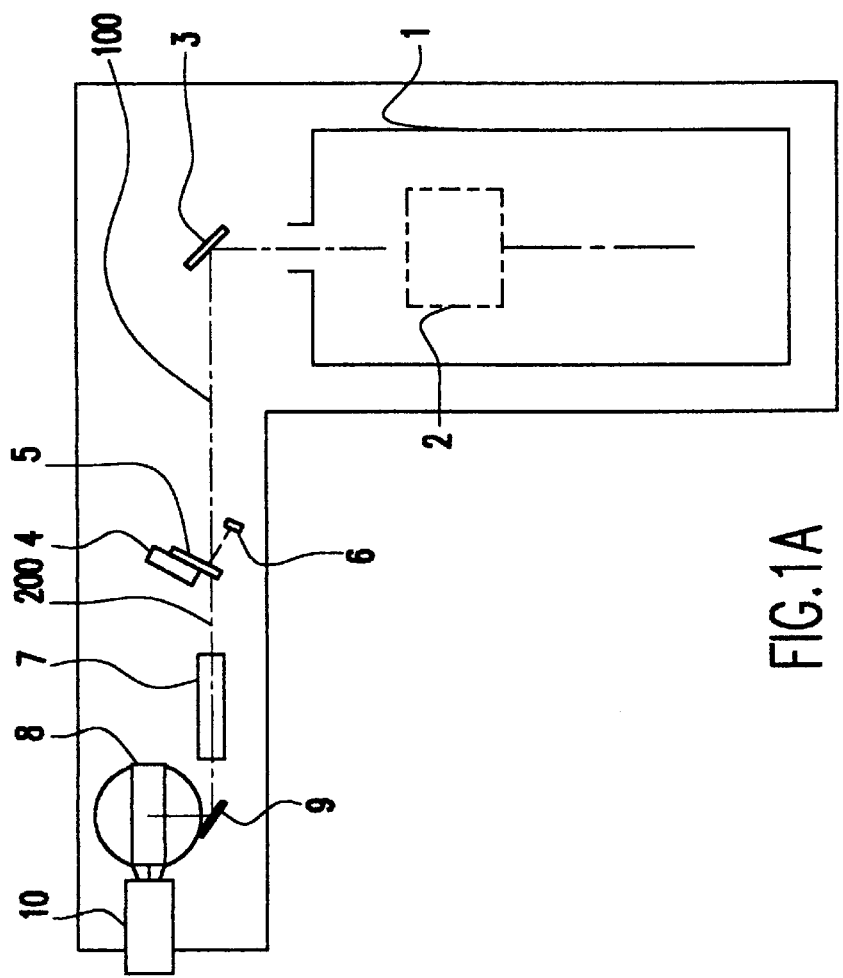
FIG.1A
FIG.1B

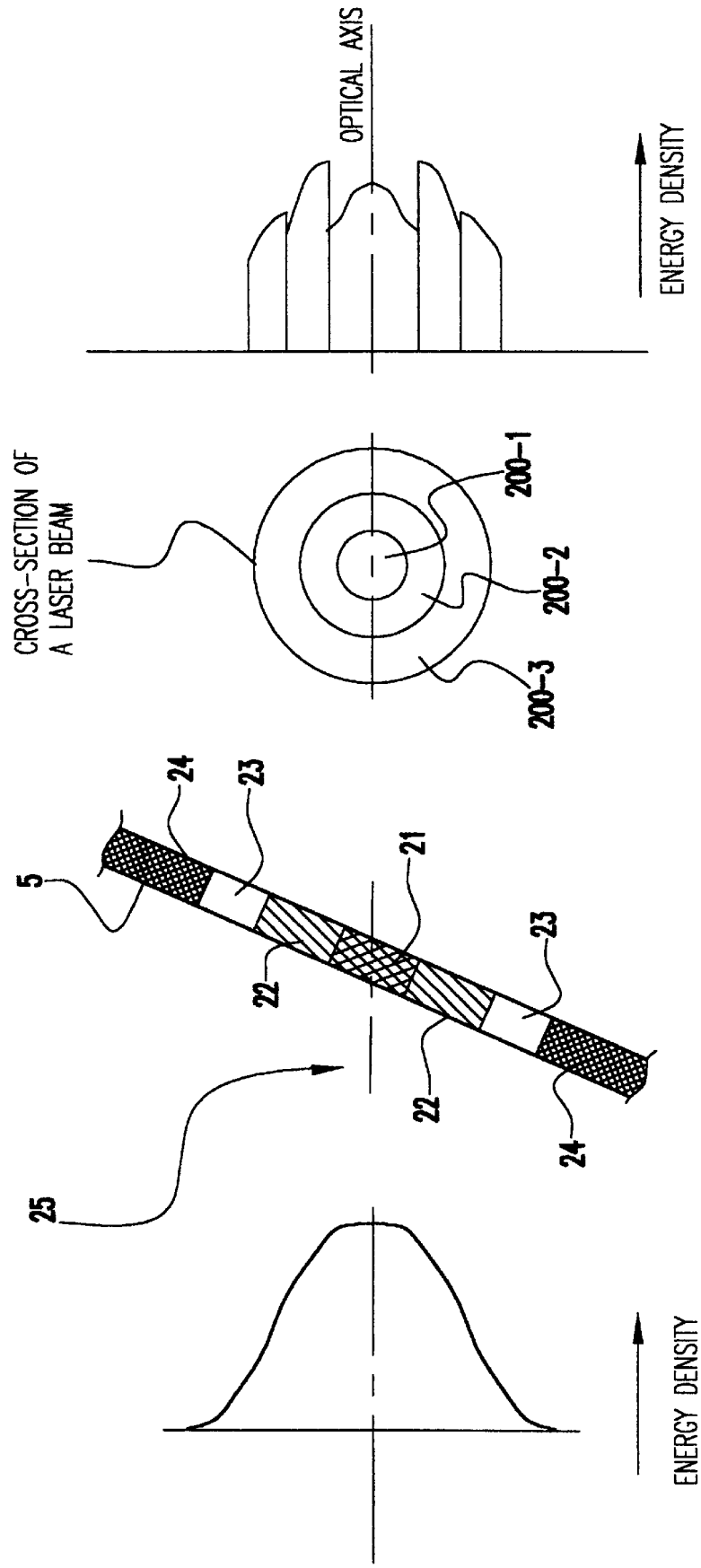

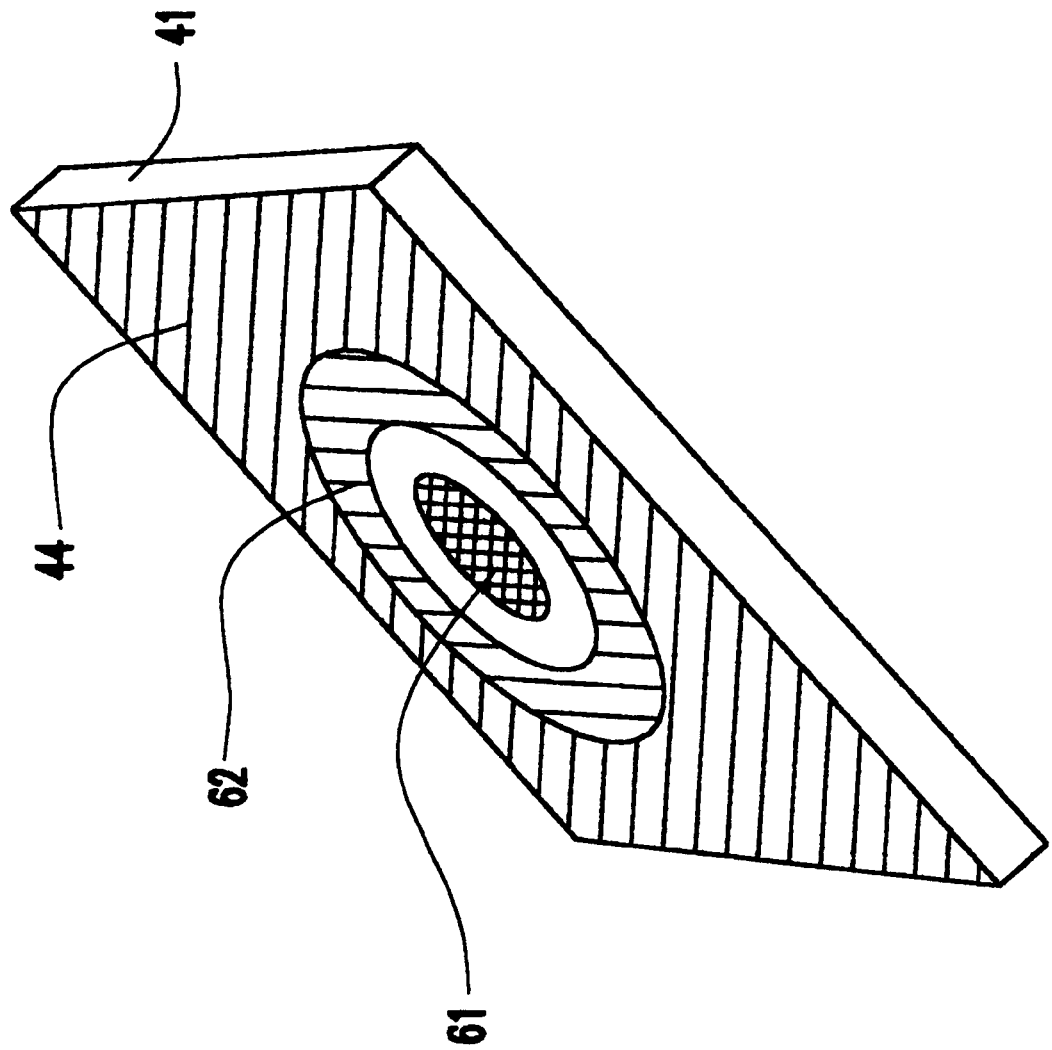

METHOD AND APPARATUS FOR MARKING PATTERNS BY A SCANNING LASER BEAM, A MASK APPLIED TO THE SAME APPARATUS

BACKGROUND OF THE INVENTION

1. Field of the Invention

The present invention relates to a beam scanning type laser marking method and apparatus for marking patterns such as characters on an processing object by scanning the same with a continuous wave (CW) Q-switch pulse laser beam, and moreover to a mask to be applied to such beam scanning type laser marking apparatus.

2. Description of the Related Art

A conventional laser marking method is disclosed in the Japanese Patent Laid-Open No. HEI 2-165881. The method therein is the so-called a mask transmitting type laser marking method. In this method, a mask on which a pattern to be marked such as characters are previously depicted is irradiated with a pulse excitation laser beam. The laser beam having transmitted through the mask is focused on the surface of processing object, that is, on the marking surface. The focused laser beam prints the pattern depicted on the mask to the processing object.

In this mask transmitting type laser marking method, kinds of patterns to be depicted on the mask is limited. Moreover, a mask must be newly generated for every change Meanwhile, a beam scanning type laser marking apparatus, which is different from the mask transmitting type laser marking apparatus, is disclosed in the Japanese Patents Laid-Open Nos. SHO 59-45091 and 60-221721. In this apparatus, a laser beam obtained by the CW Q-switch pulse oscillation is focused on the marking surface of an processing object. The desired characters or signs are marked on the processing object by making the scanning the surface thereof with the laser beam focused through the use of a scanner mirror.

This beam scanning type laser marking apparatus is not required to use a mask on which the desired pattern is stationarily depicted and moreover to provide a liquid crystal mask and a driving device thereof. Therefore, this apparatus has reasonably reduced the apparatus cost and running cost thereof in comparison with the mask transmitting type laser marking apparatus explained above.

In this beam scanning type laser marking apparatus, an energy density of laser beam for irradiating the surface of processing object is intensified because the laser beam is focused on the marking surface. As a result, substances at the region irradiated with the laser beam is momentarily vaporized and the processing depth of the marking line reaches about 50 to 100 $\mu$m. Accordingly, contour of the pattern marked on the processing object becomes ambiguous and the pattern is no longer recognized accurately. In of the shape of pattern marked, resulting in a problem that considerable time and cost are required for generation of mask. Moreover, there rises a problem that management of mask is very complicated with increase in the number of masks generated.

In addition, the Japanese Patents Laid-Open Nos. HEI 2-187288 and 2-251387 disclose laser marking apparatuses utilizing masks (hereinafter referred to as liquid crystal mask) formed by a liquid crystal device. This apparatus utilizes a liquid crystal mask as the mask used in the mask transmitting type laser marking apparatus explained above. A desired pattern can be depicted on a liquid crystal mask by driving the liquid crystal mask using the predetermined data. As explained, the pattern depicted on the mask can be generated and stored in the flexible data format by utilizing the liquid crystal mask. Accordingly, mask generation cost and management cost thereof can be remarkably be saved.

However, the laser marking apparatus utilizing such liquid crystal mask requires a driving device for driving the liquid crystal mask. Therefore, the marking apparatus itself brings about increase in size and rise of cost. Moreover, since the liquid crystal panel is limited in its operation life and the liquid crystal panel must be replaced in every predetermined period, a running cost is necessarily raised. addition, since the marking line is processed deeply, when this method is employed for the marking at the surface of thinner electronic parts, such electronic parts are damaged with the laser beam used for irradiation. Therefore, the beam scanning type laser marking apparatus explained above cannot be used for marking the desired pattern on the thinner electronic part.

Furthermore, when a processing object is an electronic part, the pattern to be marked sometimes includes a wider pattern such as a trade mark. In the case of marking wider patterns on the electronic part with the conventional beam scanning type laser marking apparatus, it must be considered as a problem that the processing capability is lowered remarkably in comparison with the mask transmitting type marking apparatus.

SUMMARY OF THE INVENTION

It is an object of the present invention to provide a beam scanning type laser marking method and apparatus capable of depicting marking patterns having the clear contour for accurate recognition.

It is another object of the present invention to provide a beam scanning type laser marking method and apparatus which can clearly mark desired patterns on a thinner electronic part without damaging the part.

It is the other object of the present invention to provide a beam scanning type laser marking method and apparatus which can effectively mark wider patterns.

It is further object of the present invention to provide a mask which can convert laser beam with Gaussian energy distribution into the laser beam with uniform energy distribution, which is used for marking desired patterns.

In order to achieve the objects explained above, the beam scanning type laser marking method of the present invention forms a focused image of the mark pattern by causing the laser beam to be transmitted through the mask having the mask pattern for leveling energy distribution at the section of the laser beam. The desired characters or signs can be depicted on the processing object by scanning the processing object with such focused mask pattern.

Moreover, in view of achieving the objects explained above, the beam scanning type laser marking apparatus of the present invention comprises a mask having a mask pattern for leveling the energy distribution at the section of the laser beam emitted from the laser oscillator and a means for scanning the processing object with the focused image of mask pattern formed by the laser beam when it is transmitted through the mask for the marking of the desired characters or signs on the processing object.

In addition, in order to achieve the objects explained above, a mask applied to the beam scanning type laser marking apparatus of the present invention is provided in the beam scanning type laser marking apparatus which realizes marking of the desired characters or signs on the processing object through the scanning with the laser beam emitted from the laser oscillator and is used for the beam scanning type laser marking apparatus having a mask pattern which allows transmission of the laser beam emitted from the laser oscillator. This mask pattern is formed by concentrically arranging a plurality of substances having different transmissivities for the laser beam.

BRIEF DESCRIPTION OF THE DRAWINGS

The above and other objects, features and advantages of the present invention will become more apparent from the following detailed description taken with the accompanying drawings in which:

FIG. 1A is a plan view illustrating a structure of a first embodiment of the present invention.

FIG. 1B is a side view illustrating a structure of the first embodiment of the present invention shown in FIG. 1A.

FIG. 2A is a diagram illustrating energy distribution of a laser beam emitted from a laser oscillator.

FIG. 2B is a cross-sectional view illustrating an embodiment of a mask pattern provided on a mask shown in FIG. 1A.

FIG. 2C is a diagram illustrating a structure of a cross-section of the beam flux of laser beam having transmitted the mask shown in FIG. 2B.

FIG. 2D is a diagram illustrating energy distribution of a laser beam having transmitted the mask shown in FIG. 2B.

FIG. 6 is a diagram illustrating an example of a mask pattern provided at the mask when it is set with inclination of the predetermined angle or more.

DETAILED DESCRIPTION OF THE PREFERRED EMBODIMENTS

Figure 3:
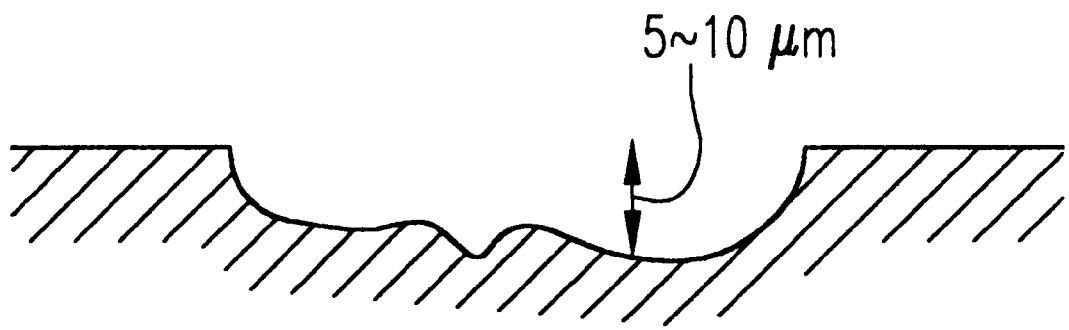
FIG. 3 is a diagram illustrating the processing condition of a marking line depicted on a processing object with the first embodiment of the present invention.

Next, the preferred embodiments of the present invention will be explained in detail by referring to the accompanying drawings.

In the first embodiment of the present invention, energy density at the center of the laser beam having the Gaussian energy distribution emitted from a laser oscillator is lowered. The processing depth of the marking line can be suppressed sufficiently by irradiating a processing object with the laser beam having the lowered energy density at the center thereof.

Referring to FIG. 1A and FIG. 1B, a laser oscillator 1 is provided with an Acousto-optic Q-switch element 2 which operates when the ultrasonic wave is applied to an acoustic-optical element. The laser oscillator 1 emits the laser beam 100 due to the continuous wave (CW) Q-switch pulse oscillation in synchronization with a Q-switch control signal which is a repetitive frequency of RF power transmitted from a control circuit (not illustrated). The laser beam 100 emitted from the laser oscillator 1 is reflected by an optical axis adjusting mirror 3 to expand a beam diameter with a beam expander 7. A mask 5 providing a mask pattern for shielding the external circumference portion of the laser beam 100 and leveling the energy density at the center of the laser beam is provided between the optical axis adjusting mirror 3 and beam expander 7. The mask 5 is fixed by a mask holder 4. The laser beam 100 reflected by the optical axis adjusting mirror 3 passes through the mask 5. The laser beam 200 having passed the mask 5 and having its beam diameter expanded by the beam expander 7 is thereafter reflected by scanner mirrors mounted on the galvanometers 9 and 10 and is then focused at the marking surface on the processing object 11 passing through a fθ lens 8. The focused laser beam 200 scans the marking surface of the processing object 11 with the reciprocal rotating drive of the galvanometers 9 and 10. This beam scanning method using two galvanometers is known. The laser beam 200 scans the marking surface to mark the predetermined characters or signs on the processing object 11.

That is, the mask 5 arranged between the optical axis adjusting mirror 3 and beam expander 7 shapes, when the laser beam 100 having the Gaussian energy distribution have passed the mask 5, the cross-sectional shape of the beam flux of the laser beam 100 into a circular shape and also levels the energy density at the center of the beam flux. In more practical, the mask 5 has a mask pattern which concentrically changes in multiple levels the transmissivity for the laser beam 100 around the center part to transmit the laser beam 100 and almost perfectly shields the laser beam 100 at the external circumference thereof. The laser 200 having passed the mask 5 is focused at the marking surface on the processing object 11.

The mask 5 is mounted on the mask holder 4 with the predetermined inclination of about, for example, 1 to 5 degrees with respect to the optical axis of the laser beam 100 so that the laser beam reflected by the mask 5 is never returned to the laser oscillator 1.

Meanwhile, the laser beam reflected by the mask 5 is received by a beam receiving plate 6. Therefore, the laser beam reflected by the mask 5 is never incident to the laser oscillator 1. Moreover, when inclination angle of the mask 5 is increased, interference of the laser beam reflected by the mask 5 with the laser beam 100 emitted from the laser oscillator 1 can be prevented.

Next, operations of this embodiment will be explained with reference to FIG. 1A, FIG. 1B, FIGS. 2A to 2D and FIG. 3.

The CW Q-switch pulse laser beam 100 emitted from the laser oscillator 1 is reflected by the optical axis adjusting mirror 3 and passes through the mask 5. Therefore, the laser beam 100 with the Gaussian distribution shown in FIG. 2A is converted to the laser beam 200 with energy distribution shown in FIG. 2D because it has passed through the mask 5 shown in FIG. 2B. Referring to FIG. 2B, the mask 5 is provided, for example, with a mask pattern 25 formed by almost concentrically arranging the region 21 with the transmissivity of 20%, the region 22 with the transmissivity of 50% and the region 23 with the transmissivity of 99%. In the cross-section of the laser beam 200 having passed this mask pattern 25, as shown in FIG. 2C, the laser beam 200-1 having passed the region with the transmissivity of 20%, the laser beam 200-2 having passed the region 22 with the transmissivity of 50% and the laser beam 200-3 having passed the region 23 with the transmissivity of 99% are concentrically arranged. The external circumference portion of the cross-section of the beam flux of the laser beam 200 having passed the mask pattern 25 is shaped to almost circular shape because the incident laser beam 100 is shielded by the region 24 with the transmissivity of 0% of the mask pattern. The laser beam 200 having passed the mask 5 expands its beam diameter through the expander 7 and thereafter is reflected by the scanner mirrors mounted on the galvanometers 9 and 10 and moreover focused on the marking surface via the fθ lens 8. The focused laser beam 200 scans the processing object 11 with the reciprocal rotating drive of the galvanometers 9 and 10. The predetermined pattern such as a character is marked on the processing object 11 with the laser beam 200 having scanned the marking surface.

In this embodiment, since the energy given in the width direction of the line depicted through movement of the focused beam spot on the processing object is leveled, the processing depth of the marking line depicted by this laser beam becomes very shallow as about 5 to 10 µm as shown in FIG. 3.

As explained, since the processing depth of the depicted line can be kept as about 5 to 10 µm in the beam scanning type laser marking apparatus of the present invention, the depicted line can be distinguished very easily. Moreover, since the processing depth is shallow, marking can be done to a thinner electronic part without giving damage thereon.

Next, a practical structure of a mask will be explained by referring to FIGS. 4A to 4C and FIG. 5.

Figure 5:
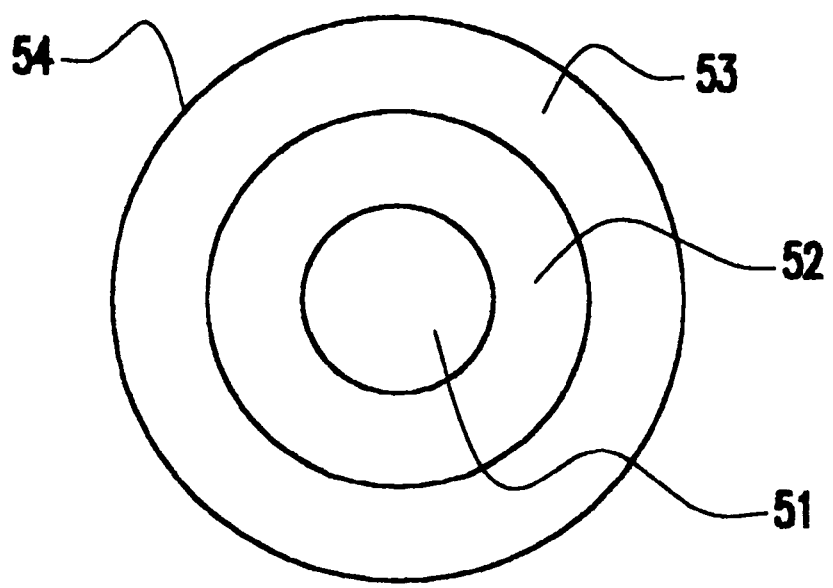
FIG. 5 is a cross-sectional view illustrating a beam flux of the laser beam having transmitted the mask shown in FIG. 4A or FIG. 4B.
Figure 4C:
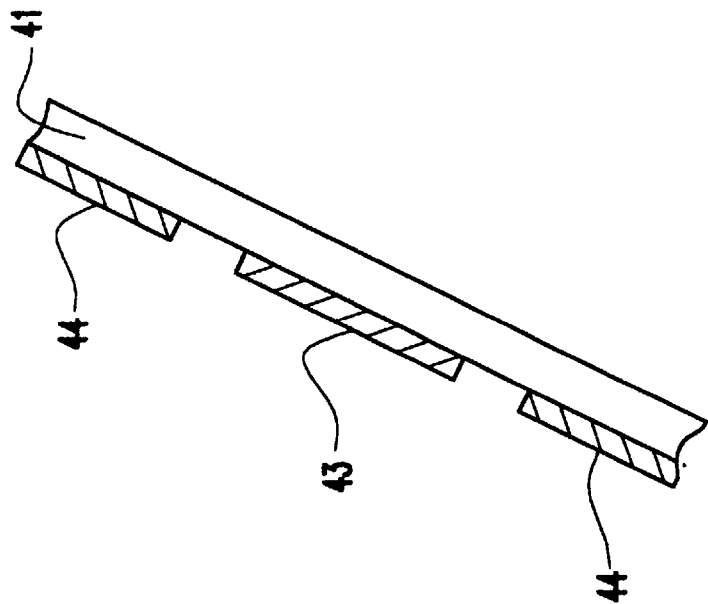
FIG. 4C is a diagram illustrating a structure of the other embodiment of the mask of the present invention.
Figure 4B:
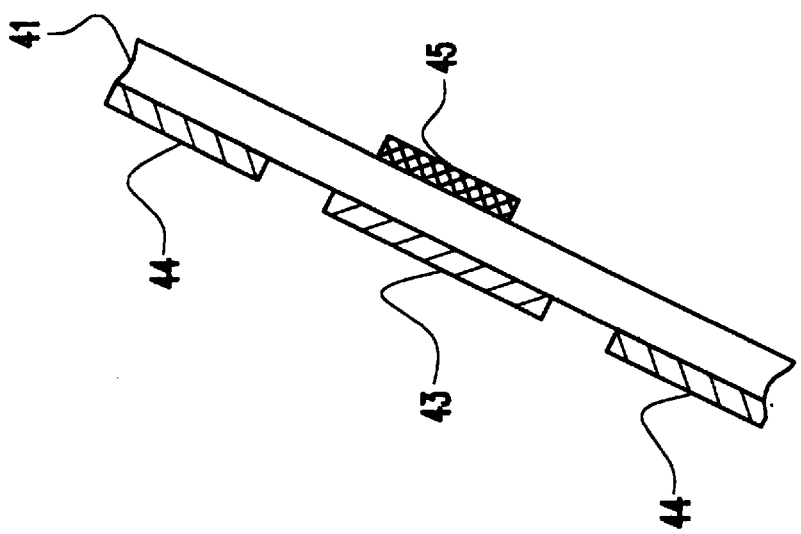
FIG. 4B is a diagram illustrating a structure of the other embodiment of the mask of the present invention.
Figure 4A:
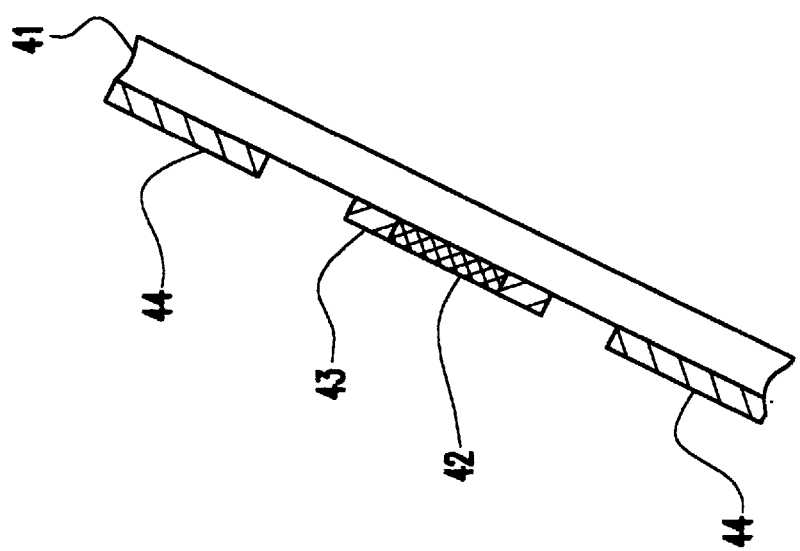
FIG. 4A is a diagram illustrating a structure of an embodiment of the mask of the present invention.

By referring to FIG. 4A, at one side surface of a glass substrate 41 which is a transparent substrate with laser beam transmissivity of about 100%, a reflection coat 42 with the transmissivity of [a] % and a reflection coat 43 with the transmissivity of [b] % formed of a dielectric multilayer film are concentrically formed. Moreover, a total reflection coat 44 also formed of the dielectric multilayer film is arranged surrounding the region where the glass substrate 41 in the periphery of the reflection coat 43 is exposed. Here, region where the glass substrate 41 is exposed has the laser beam transmissivity of almost 100% and the total reflection coat 44 has the transmissivity of almost 0% to the laser beam. The beam flux of the laser beam having passed the mask 5 having such mask pattern has the cross-section where the laser beam 51 having passed the mask 5 in the transmissivity of [a] %, the laser beam 52 having passed the mask 5 in the transmissivity of [b] % and the laser beam 53 having passed the glass substrate 41 are concentrically arranged from the center of the optical axis as shown in FIG. 5. The energy density of the laser beam passing through the mask pattern can be leveled by setting the transmissivity at the center of the mask pattern smaller than that of the peripheral part thereof. In addition, the cross-section 54 of the laser beam having passed the mask pattern can be shaped to almost circular shape by providing the total reflection coat with transmissivity of almost 0% to the peripheral part of the mask pattern.

Moreover, with reference to FIG. 4B, as the other embodiment of the mask, a reflection coat 43 in the transmissivity of [b] % formed of a dielectric multilayer film and the total reflection coat 44 are concentrically arranged in the sequence of the reflection coat 43, the region where the glass substrate 41 is exposed and the total reflection coat 44 at the one side surface of the glass substrate 41. Meanwhile, on the other side of the glass substrate 41, a reflection coat 45 in the transmissivity of [a/b] % formed of the dielectric multilayer film is provided at the position opposed to the reflection coat 43. The cross-section of beam flux of the laser beam having passed the mask 5 with the mask pattern shown in FIG. 4B is also as shown in FIG. 5 explained previously.

Moreover, with reference to FIG. 4C, a reflection coat 43 in the transmissivity of [b] % formed of a dielectric multilayer film is provided at the one side surface of the glass substrate 41. In the peripheral area of the reflection coat 43, the glass substrate 41 is exposed and moreover the total reflection coat 44 in the transmissivity of almost 0% is provided at the peripheral area thereof. In this embodiment of the mask, the small number of reflection coats concentrically formed on the glass substrate 41 are provided in comparison with the mask shown in FIG. 4A or FIG. 4B. However, the energy of laser beam having passed such a mask can sufficiently be leveled. However, for further sufficient leveling of the energy density of the laser beam, it is preference to increase the number of reflection coats to be provided concentrically.

As the transmissivities [a] and [b] of the laser beam at each reflection coat, optimal values can be selected according to the beam diameter and energy density of the laser beam. In more practical, the laser beam can be leveled by respectively selecting the values of [a] and [b] as 20 and 50.

When the mask is provided with a large inclination angle for the optical axis of the laser beam 100, the shape of the mask pattern provided at the mask must be changed to the elliptical shape in order to obtain the circular cross-section of the beam flux of the laser beam having passed the mask. An example of the mask pattern having the elliptical reflection coat is shown in FIG. 6. The reflection coat 61 in the transmissivity of a and the reflection coat 62 in the transmissivity of [b] are formed in the elliptical shape.

In the case of executing the marking with the focused laser beam of which only external circumference is shielded the processing depth at the center of depicted line becomes as deep as 30 to 50 µm, still resulting in a problem of the processing depth. In the case of the existing marking by scanning with the laser beam or the marking by scanning with the focused laser beam of which only external circumference is shielded, energy density at the center of the laser beam becomes higher and moreover energy is concentrated at the center of the depicted line because the condensed spot or focused image used for the scanning are overlapped from one to the other on the depicted line. It is a reason of providing a larger processing depth. Therefore, the processing depth of depicted line can be suppressed to about 10 to 20 µm by realizing the marking process with a ring type focused image of laser beam which is obtained by shielding the center area and external circumference of the laser beam. However, in the case of using such ring type focused laser beam, unprocessed areas are generated by the shielded center area of the laser beam at the starting and ending points of the depicted line, greatly deteriorating the appearance of the depicted line.

Meanwhile, in this embodiment, a mask pattern having the center area where the transmissivities of the laser beam are changed in multilevels is used so that the energy given in the width direction of the line depicted through scanning of the focused image of beam is leveled. Therefore, processing depth obtained by the focused spot can be suppressed to about 5 to 10 μm. Moreover, the line having the well-formed starting and ending points can be depicted.

Figure 7:
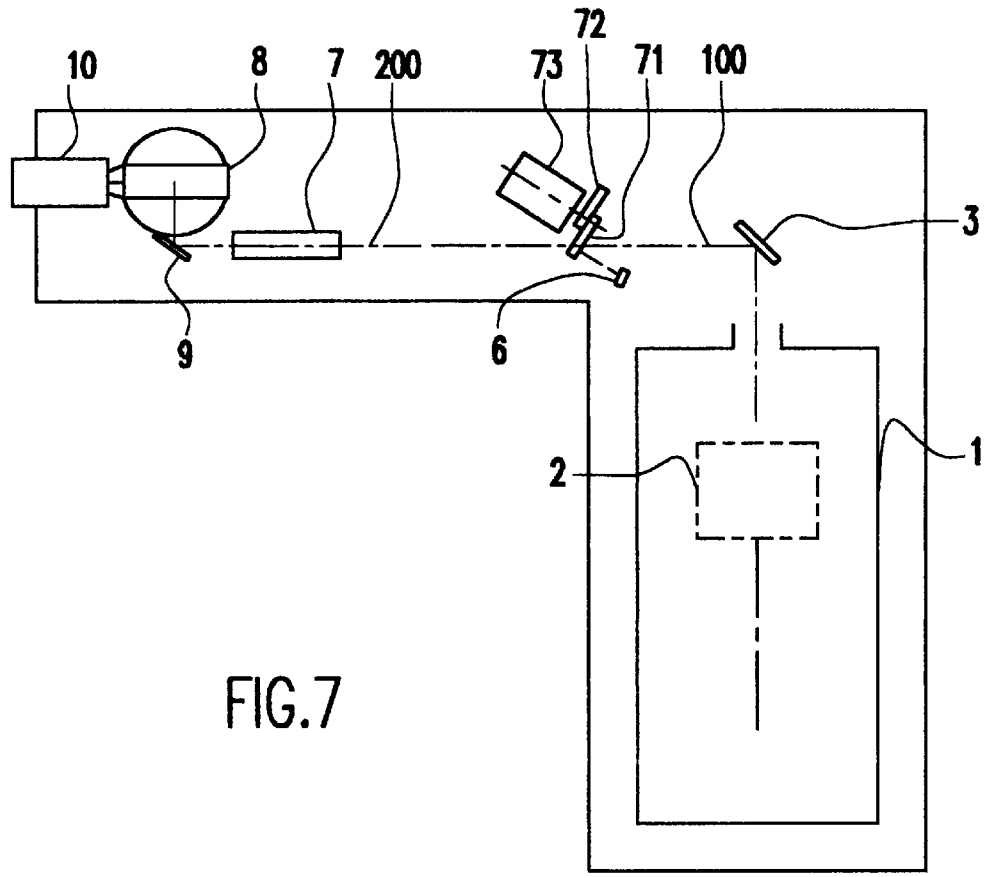
FIG. 7 is a plan view illustrating a structure of the second embodiment of the present invention.
Figure 8:
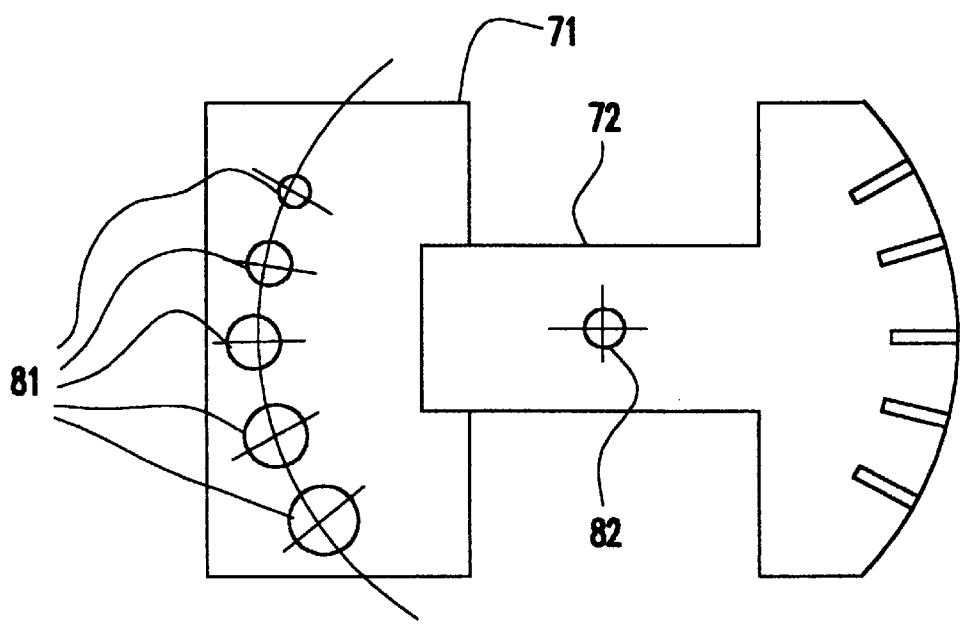
FIG. 8 is a diagram illustrating a structure of the mask and mask holder shown in FIG. 7.

Next, the second embodiment of the present invention will then be explained with reference to FIG. 7 and FIG. 8.

As explained previously, in the case of marking the predetermined character patterns on an electronic part with a laser marking apparatus, the character patterns to be depicted often include a wide variety of patterns such as trade marks. Unlike the mask transmitting type marking apparatus of the prior art, the beam scanning type laser marking apparatus cannot mark the wide pattern by irradiating at a time the mask with the laser beam. Therefore, first, the marking of the contour part of the wide pattern is performed. Thereafter, the next marking is performed to completely mark the inside of the contour part. Usually, in the case of marking the contour part, the contour line is depicted as thinner as possible to make the edge part as sharp as possible. However, if such a thinner line is used at the time of completely marking the inside portion of the contour part, a very longer time is required to completely mark the inside portion and it is not efficient.

Therefore, the second embodiment of the present invention is provided with a means which changes the line width such that the line width becomes thinner to depict the contour part and thicker to mark the inside portion of the contour part.

A size of focused beam is changed by causing the laser beam 100 emitted from the laser oscillator 1 to pass through the mask patterns of different sizes according to the size of the part to be marked. In more practical, as shown in FIG. 8, a mask 71 on which a plurality of mask patterns 81 are arranged concentrically in different diameters through which the laser beam 100 passes is mounted on a pulse motor 73 via a mask holder 72. A focused laser spot of the size depending on the size of the mask pattern 81 can be formed on the marking surface of the processing object 11 by controlling the pulse motor 73 to align the mask pattern 81 having the desired size to the optical axis of the laser beam 100. That is, the desired mask pattern 81 can be arranged on the optical axis of the laser beam 100 by rotating the mask 71 and mask holder 72 around the rotating shaft 82 of the pulse motor 73. As explained above, the line of the desired thickness can be depicted by executing the marking process through selection of the mask pattern of the desired size according to the size of the part to be marked of the character or sign.

Here, it is also effective that a mask pattern with a large diameter among a plurality of mask patterns 81 provided at the mask 71 is formed with many reflection coats with different transmissivities.

Figure 9A:
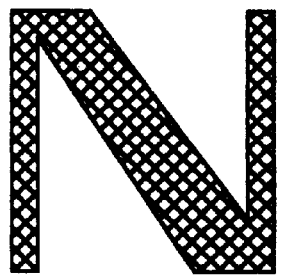
FIG. 9A is a diagram illustrating a wide-line character to be marked with the laser marking apparatus of the second embodiment of the present invention.
Figure 9B:
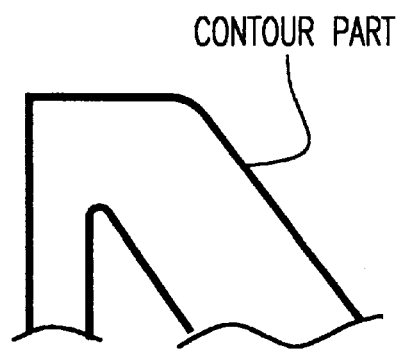
FIG. 9B is a diagram illustrating a condition where the contous portion of the character shown in FIG. 9A is marked.
Figure 9C:
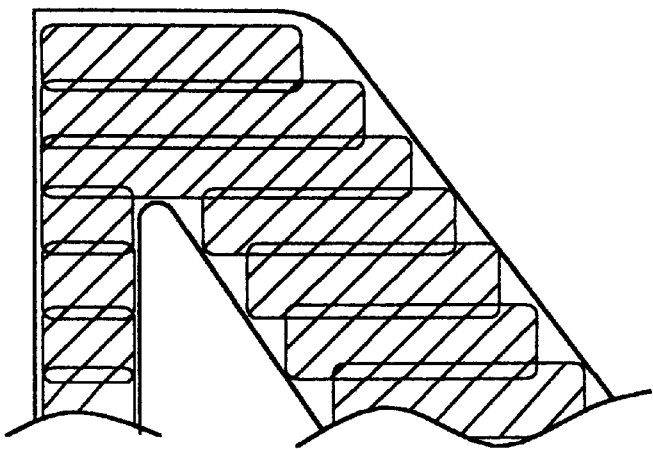
FIG. 9C is a diagram illustrating a condition where the inside of the contour portion of the character shown in FIG. 9A is completely marked.
Figure 10:
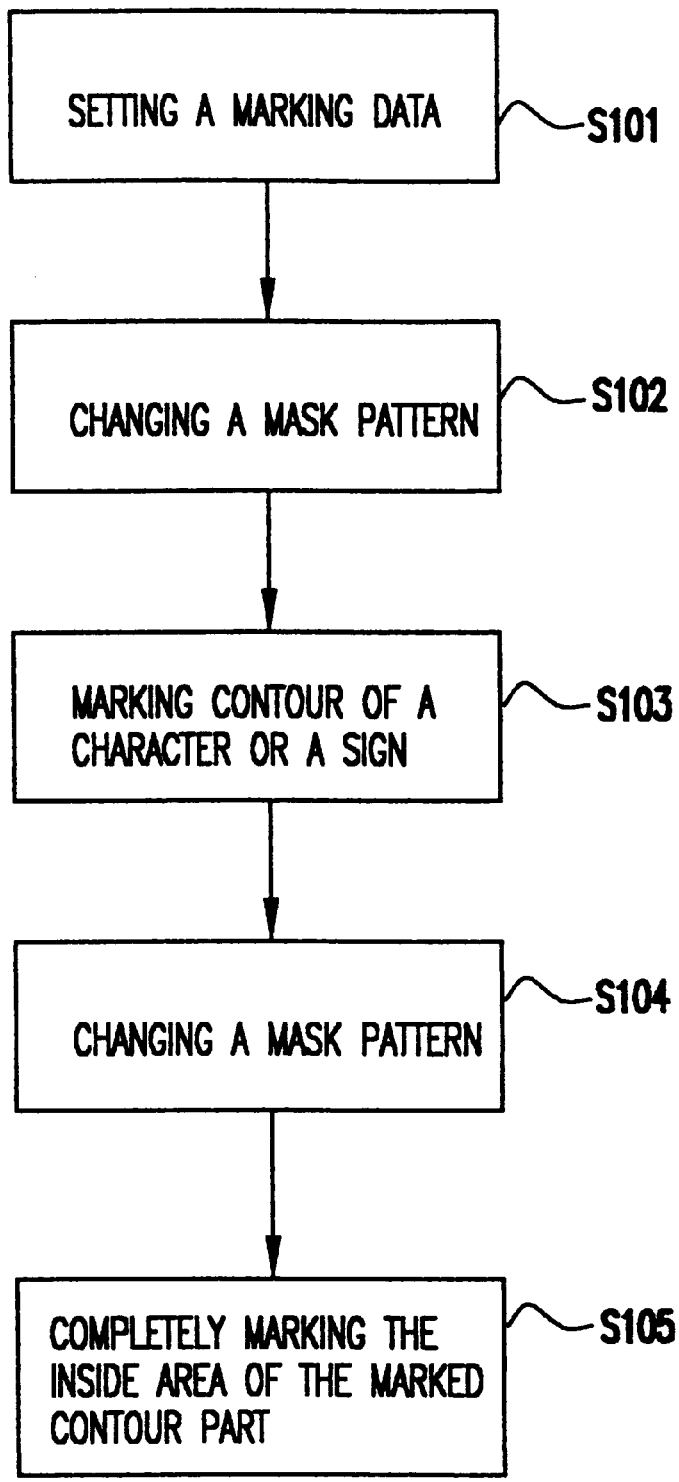
FIG. 10 is a flowchart indicating the sequence for marking a wide-line character or sign.

Next, a method of marking a character or sign, as shown in FIG. 9A, which requires complete marking of the inside after depicting a contour line will be explained with reference to FIGS. 9A to 9C and FIG. 10. First, a marking data for making a character as shown in FIG. 9A is set to a control circuit (S101). A mask pattern is changed by controlling a pulse motor to align the small size mask pattern to the optical axis of the laser beam (S102). When the small size mask pattern is aligned to the optical axis of the laser beam, a small focused spot can be obtained and marking can be realized with a thinner line by scanning such small size focused spot. As the first process, as shown in FIG. 9B, the contour part of this character is marked with a thinner line not to destory the appearance of the character to be marked, that is, to obtain the sharp corner areas (S103). Next, the mask pattern is changed by controlling the pulse motor to align the large size mask pattern to the optical axis of laser beam (S104). Thereby, a large focused spot can be obtained and marking can be executed with a thick line by scanning with such large focused spot. As the second process, the marking is performed to completely mark the inside area of the contour line with a thick line as shown in FIG. 9C (S105). As explained above, the processing time can be remarkably reduced while maintaining the sharpness of the contour part of the marked character by changing a size of mask pattern.

What is claimed is:

1. A beam scanning type laser marking method for marking a character or sign on a processing object by scanning said object with a laser beam, comprising the steps of:

passing said laser beam through a mask having a plurality of mask patterns which level an energy distribution at a section of said laser beam to focus an image of said mask patterns; and scanning said focused image with said laser beam on said processing object, wherein said plurality of mask patterns have areas of different sizes to transmit said laser beam, and further comprises a step of changing a diameter of laser beam having passed said mask by selecting desired mask pattern, wherein a first mask pattern having a small area to transmit said laser beam is selected for marking a contour part of said character or sign and a second mask pattern having an area to transmit said laser beam which is larger than said area of said first mask pattern is selected for marking an inside area of said contour part.

2. A beam scanning type laser marking method as claimed in claim 1, wherein said plurality of mask patterns include a plurality of concentrically arranged substances with different transmissivities for said laser beam.

3. A beam scanning type laser marking method as claimed in claim 2, wherein said plurality of mask patterns of said mask include a first reflection coat which has, on a transparent substrate, a first dielectric multilayer film with a first transmissivity which is larger than 0% but is smaller than 100% for said laser beam, and a total reflection coat at an external circumference of said first reflection coat to shield said laser beam.

4. A beam scanning type laser marking method as claimed in claim 3, wherein said plurality of mask patterns of said mask include at least one ring form second reflection coat having at least one kind of dielectric multilayer film with a transmissivity different from said first transmissivity and being arranged at the external circumference of said first reflection coat.

5. A beam scanning type laser marking method as claimed in claim 1, wherein said plurality of mask patterns include at least first and second areas, said first area lying within said second area and having a transmissivity lower than a transmissivity of said second area.

6. A beam scanning type laser marking method as claimed in claim 5, wherein said plurality of mask patterns include a third area located outside of said first and second areas, said third area having a transmissivity of approximately 0% for shaping said laser beam.

7. A beam scanning type laser marking apparatus for marking a character or sign on a processing object by scanning said object with a laser beam, comprising:

a mask having a plurality of mask patterns which level an energy distribution at a section of said laser beam; and a device which scans said processing object with a focused image of said plurality of mask pattern formed when said laser beam passes through said mask;

wherein said plurality of mask patterns have a small size area and a large size area to transmit a laser beam, the mask patterns having said small size area being selected for marking a contour part of said character or sign, the mask patterns having said large size area being selected for marking an inside area of said contour part.

8. A beam scanning type laser marking apparatus as claimed in claim 7, further comprising:

a device which arranges said plurality of mask patterns so as to have an area of a desired size on an optical axis of said laser beam.

9. A beam scanning type laser marking apparatus as claimed in claim 7, wherein said plurality of mask is set with an inclination relative to an optical axis of said laser beam, which is incident to said mask.

10. A beam scanning type laser marking apparatus as claimed in claim 9, wherein said plurality of mask patterns have an elliptical area for transmitting said laser beam.

11. A beam scanning type laser marking apparatus as claimed in claim 7, wherein said scanning device includes a pair of reflection mirrors provided on a pair of galvanometers for scanning said laser beam having passed the mask and an objective lens for focusing said laser beam reflected by said pair of reflection mirrors on said processing object.

* * * * *